US006507736B1

(12) United States Patent
Lee et al.

(10) Patent No.: US 6,507,736 B1
(45) Date of Patent: Jan. 14, 2003

(54) MULTI-LINGUISTIC WIRELESS SPREAD SPECTRUM NARRATION SERVICE SYSTEM

(75) Inventors: Youn-Tai Lee, Taipei (TW); Yung-Ting Lee, Taipei (TW); Wen-Chien Hung, Taipei (TW)

(73) Assignee: Institute for Information Industry, Taiwan (TW)

( * ) Notice: Subject to any disclaimer, the term of this patent is extended or adjusted under 35 U.S.C. 154(b) by 311 days.

(21) Appl. No.: 09/650,701

(22) Filed: Aug. 29, 2000

(51) Int. Cl.⁷ .................................................. H04Q 7/20
(52) U.S. Cl. ............................. 455/422; 455/66; 704/8
(58) Field of Search .................................. 455/422, 414, 455/426, 466, 66, 509, 434, 525; 704/8, 10, 270

(56) References Cited

U.S. PATENT DOCUMENTS 5,513,384 A * 4/1996 Brennan et al. ......... 455/180.1
5,956,649 A * 9/1999 Mitra et al. ................. 455/522
2002/0002452 A1 * 1/2002 Christy et al. ................. 704/3

\* cited by examiner

Primary Examiner—William Trost
Assistant Examiner—Sharad Rampuria
(74) Attorney, Agent, or Firm—Lowe Hauptman Gilman & Berner, LLP

(57) ABSTRACT

A multi-linguistic wireless spread spectrum narration service system includes a speech database, a plurality of basestation units, and at least one mobile unit. The speech database is stored with multi-linguistic narration service speech messages. The plurality of basestation units are arranged at each exhibition section of an exhibition field. Each basestation unit controller captures narration service speech messages from the speech database and a wireless communication is performed. The mobile unit controller is provided to be worn by a visitor. The mobile unit detects the wireless signals of a specific basestation unit. Thus, a synchronous or asynchronous connection is built through the spread spectrum radio frequency processing and baseband processing module. Therefore, the narration service speech message from the basestation unit is received.

10 Claims, 5 Drawing Sheets

MULTI-LINGUISTIC WIRELESS SPREAD SPECTRUM NARRATION SERVICE SYSTEM

BACKGROUND OF THE INVENTION

1. Field of the Invention

The present invention relates to a narration service system, and especially to a multi-linguistic wireless spread spectrum narration service system.

2. Description of Related Art

The general narration service of an exhibition field is provided by displaying figures with characters or tables or by oral narration through narrators, or recorder with earphones worn by visitors to hearing speech narration. However, with the expansion and complex of an exhibition, more and more visitors visit the exhibition. The convention narration services are confined and not practical. Furthermore, these conventional ways can not be effectively used to peoples with different mother tongues. Thus, a large amount of speech recording tapes are made in advance. This is complex and inconvenient. If the contents of the exhibition are changed, it is often that the contents can not be updated in time. Therefore, there is an eager demand for the above narration system to be improved.

SUMMARY OF THE INVENTION

Accordingly, the primary object of the present invention is to provide a multi-linguistic wireless spread spectrum narration service system, in which a wireless transformation serves to provide a narration service so that the user may select desired language and the present invention provides an interactive environment.

Another object of the present invention is to provide a multi-linguistic wireless spread spectrum narration service system, wherein a wireless spread spectrum technology is used to suppress interference and improve communication quality.

In order to achieve above objects, the multi-linguistic wireless spread spectrum narration service system in accordance with the present invention includes: a speech database stored with multi-linguistic narration service speech messages; a plurality of basestation units adapted to be arranged at each exhibition section of a exhibition field, each basestation unit having a spread spectrum radio frequency processing and baseband processing module, a basestation unit controller and a data communication port, so that under the control of the basestation unit controller, the basestation unit controller captures narration service speech message from the speech database through the data communication port, and performs a wireless communication through the spread spectrum radio frequency processing and baseband processing module; and at least one mobile unit adapted for being worn by a visitor, the mobile unit having a voice encoder, a received power detector, a mobile unit controller, and a spread spectrum radio frequency processing and baseband processing module, so that under control of the mobile unit controller, the received power detector detects wireless signals of a specific basestation unit, and a synchronous or asynchronous connection is built through the spread spectrum radio frequency processing and baseband processing module, thereby receiving the narration service speech messages from the basestation unit controller.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
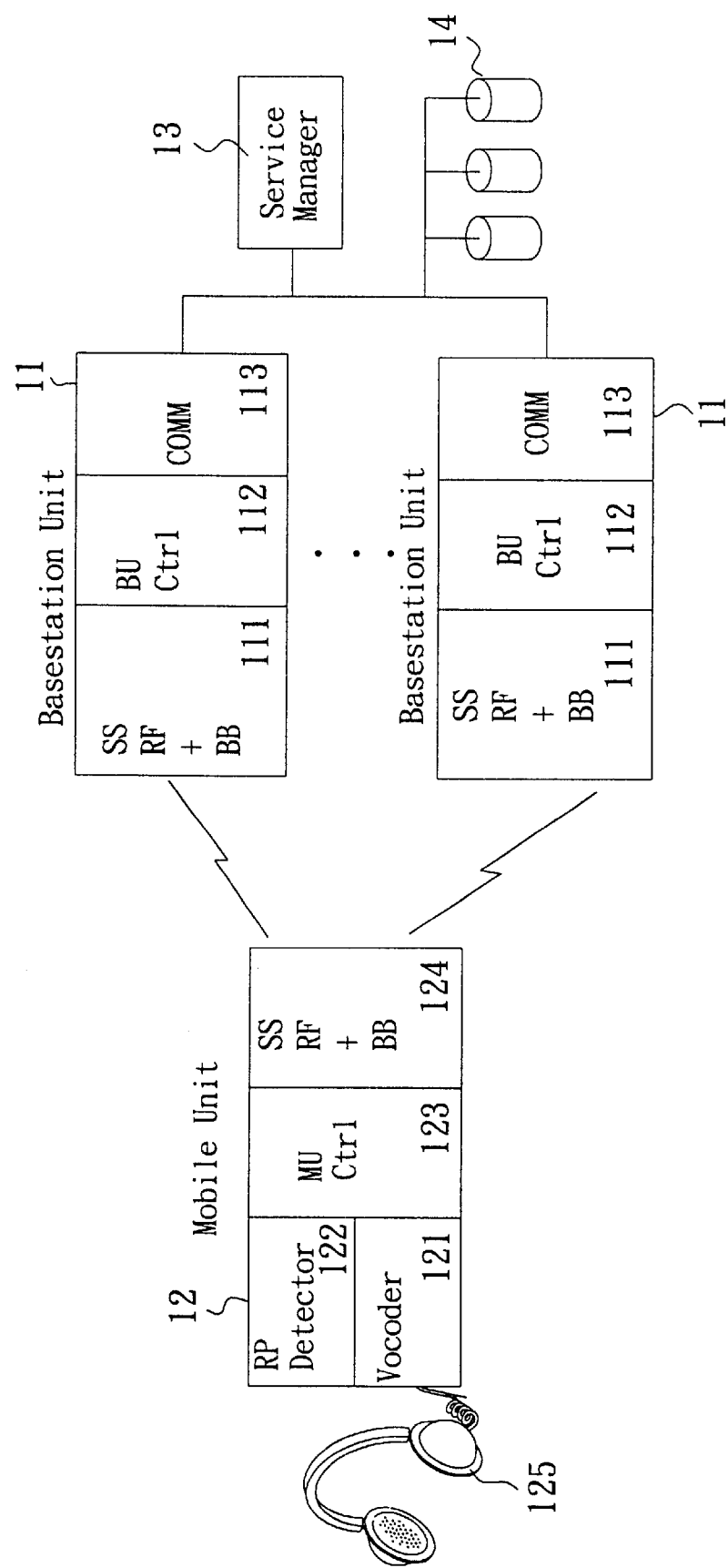
FIG. 1 shows a construction of the multi-linguistic wireless spread spectrum narration service system in the present invention.
Figure 2:
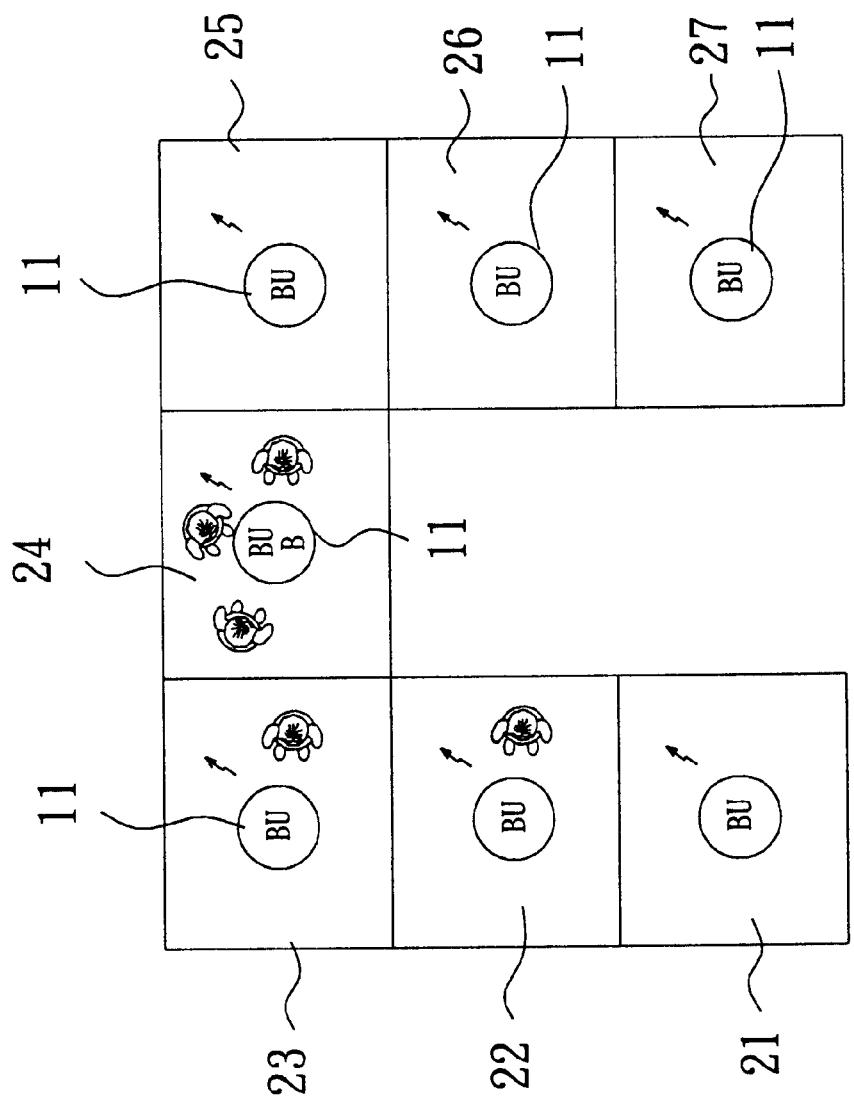
FIG. 2 shows the arrangement of the basestation unit controller of the multi-linguistic wireless spread spectrum narration service system in the present invention.

Referring to FIG. 1, a preferred embodiment of the multi-linguistic wireless spread spectrum narration service system according to the present invention is illustrated. The multi-linguistic wireless spread spectrum narration service system of the present invention is mainly formed by a plurality of basestation unit 11, at least one mobile unit 12, a service manager unit 13, and a speech database 14. The speech database 14 is stored with narration service speech messages of multi-linguistic. The service manager unit 13 serves to provide the functions of narration, service, etc. The plurality of basestation unit 11 are arranged at various exhibition sections of an exhibition field. The mobile unit 12 is worn by the visitors for hearing the narration. Referring to the example about the arrangement of the basestation unit 11 of the present invention. Each basestation unit 11 sends the narration service speech message to the visitors entering into the exhibition section by wireless transformation.

Referring to FIG. 1, the basestation unit 11 is formed by a spread spectrum radio frequency processing and baseband processing module 111, a basestation unit controller 112 and a data communication port 113 so that under control of the basestation unit controller 112, an asynchronous or synchronous wireless communication can be achieved between the spread spectrum radio frequency processing and baseband processing module 111 and mobile unit 12. Moreover, the basestation unit controller captures the narration service speech messages of the speech database 14 from the data communication port 113 for being transferring to the mobile unit 12 and then playing to the visitors.

The aforesaid mobile unit 121 is having a voice encoder 121, a received power detector 122, a mobile unit controller 123 and a spread spectrum radio frequency processing and baseband processing module 124 so that under the control of the mobile unit controller 123, the wireless signals of a specific basestation unit 11 is detected by the received power detector 122, and then a wireless connection is built by the spread spectrum radio frequency processing and baseband processing module 124 and the basestation unit 11 for receiving the narration service speech messages from the basestation unit 11. Then the message is transferred to the visitors through the earphones 125.

By the aforesaid multi-linguistic wireless spread spectrum narration service system, the visitor wearing the mobile unit 121 may move freely in the exhibition field, and a wireless connection is built according to the basestation unit 11 with respect to the exhibition section. The speech database 14 provides the speech narration message with respect to the exhibition content of the exhibition section so that the messages can be transferred to the visitors through the basestation unit 11 of the exhibition section. Thus, the visitors can hear the narration service about the articles visited. Moreover, since the speech database 14 is stored with the narration service speech messages about multi-linguistic, each mobile unit 12 awarded to the visitor can be given with an identification code (ID) for playing the speech narration messages of a specific language so as to meet the requirement of various visitors.

Figure 3:
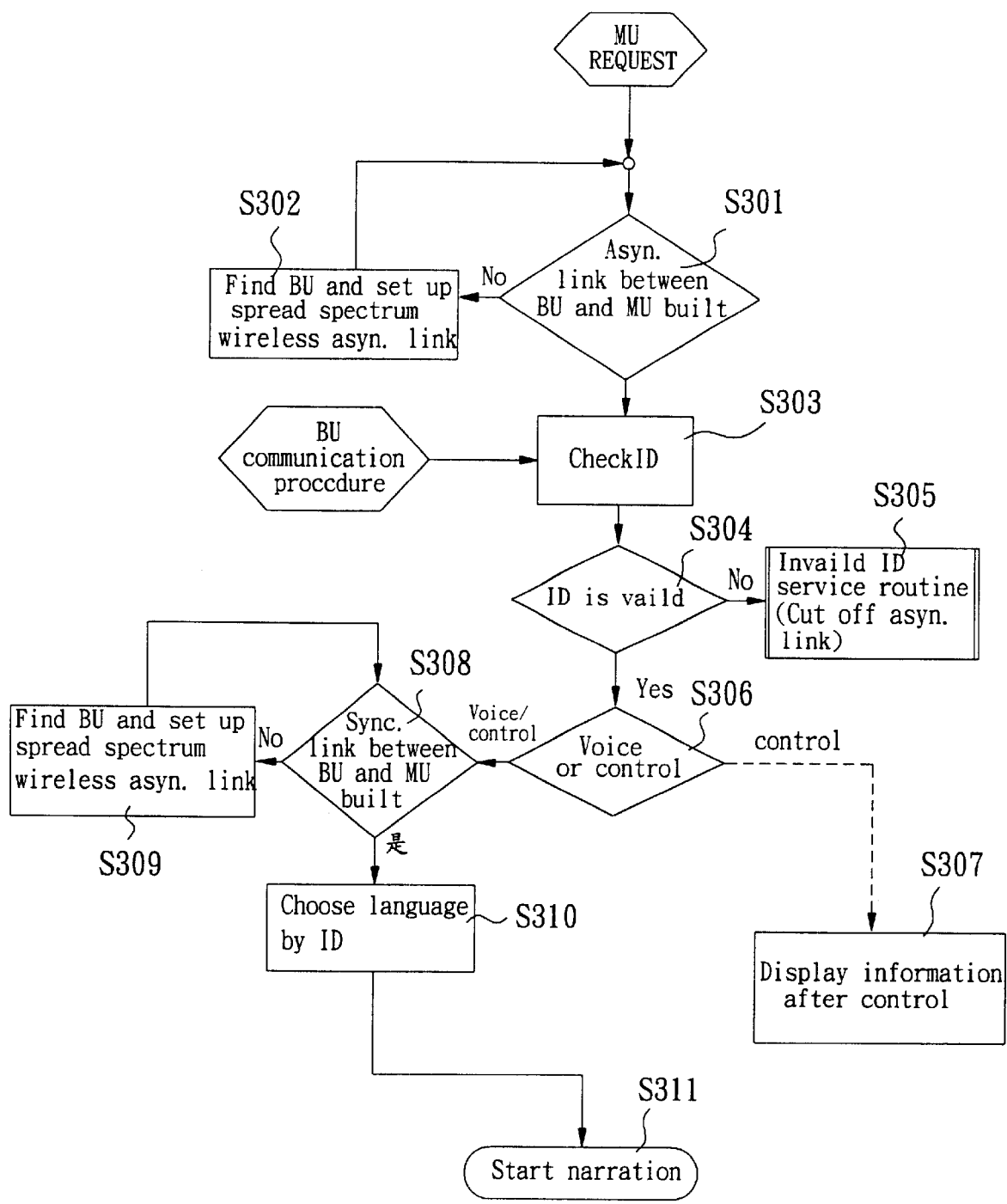
FIG. 3 is a flow chart of the speech/control communication of the mobile unit controller to the basestation unit controller in the multi-linguistic wireless spread spectrum narration service system of the present invention.

FIG. 3 shows a flow chart of the speech/control communication from the mobile unit 12 to the basestation unit 11 of the multi-linguistic wireless spread spectrum narration service system in the present invention. When a mobile unit 12 emits a control operation request about hearing narration, fast playing, rewinding, or change language, the process at least determines whether an asynchronous connection is formed between the mobile unit 12 and the basestation unit 11 (step S301). If not, the basestation unit 11 is found and then a spread spectrum wireless asynchronous connection is built (step S302). If yes, step S303 is performed for checking the ID of the mobile unit 12 and then, the process enters into the communication procedure of the basestation unit 11 and the step S303 is also performed for checking the ID of the mobile unit 12.

Then, in step S304, the process determines whether the ID is effective. If not, the mobile unit 12 is determined to be ineffective, and then the asynchronous connection is interrupted (step S 305). If yes, the process determines that a speech communication or a control operation is performed (step S 306). If only control operation is performed, then after controlling, the relative message is displayed (step S 307). If a speech/control communication is performed, and the process continuously determines whether a synchronous connection is formed between the basestation unit 11 and the mobile unit 12 (step S 308). If not, finding basestation unit 11 and building a spread spectrum wireless synchronous connection (step S 309). If a synchronous connection is formed, then in step S310, according to the language selecting from the ID, a narration service is started.

Figure 4:
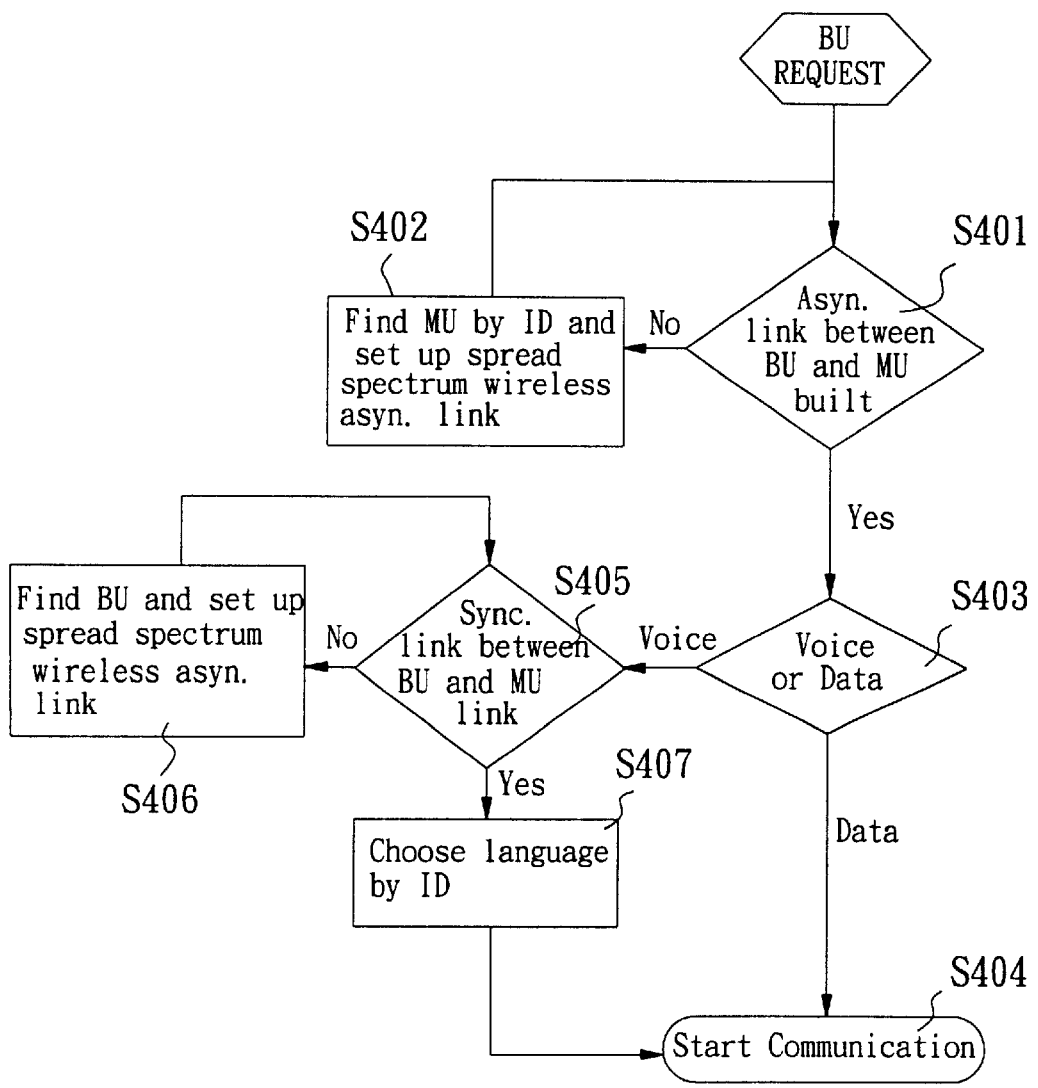
FIG. 4 is a flow chart of the speech/control communication of the basestation unit controller to the mobile unit controller in the multi-linguistic wireless spread spectrum narration service system of the present invention.

FIG. 4 is a flow chart of the speech/data communication from the basestation unit 11 to the mobile unit 12 of the multi-linguistic wireless spread spectrum narration service system. When a basestation unit 11 emits a request for, for example, a propagation, the process at first determines whether an asynchronous connection is formed between the basestation unit 11 and the mobile unit 12 (step S 401). If not, according to ID the mobile unit 12 is found and then a spread spectrum wireless asynchronous connection is built (step S 402). If an asynchronous connection is existed, the step S403 is performed for determining whether a speech or a data communication is performed. If data communication is performed, then the process determines whether a synchronous connection is existed between the basestation unit 11 and the mobile unit 12 (step S 405). If not, the basestation unit 11 is searched, and then a spread spectrum wireless synchronous connection is built (step S 406). If a synchronous connection is existed, then step S407 is performed in order to communication again according to the language selected from the ID (step S 404).

Figure 5:
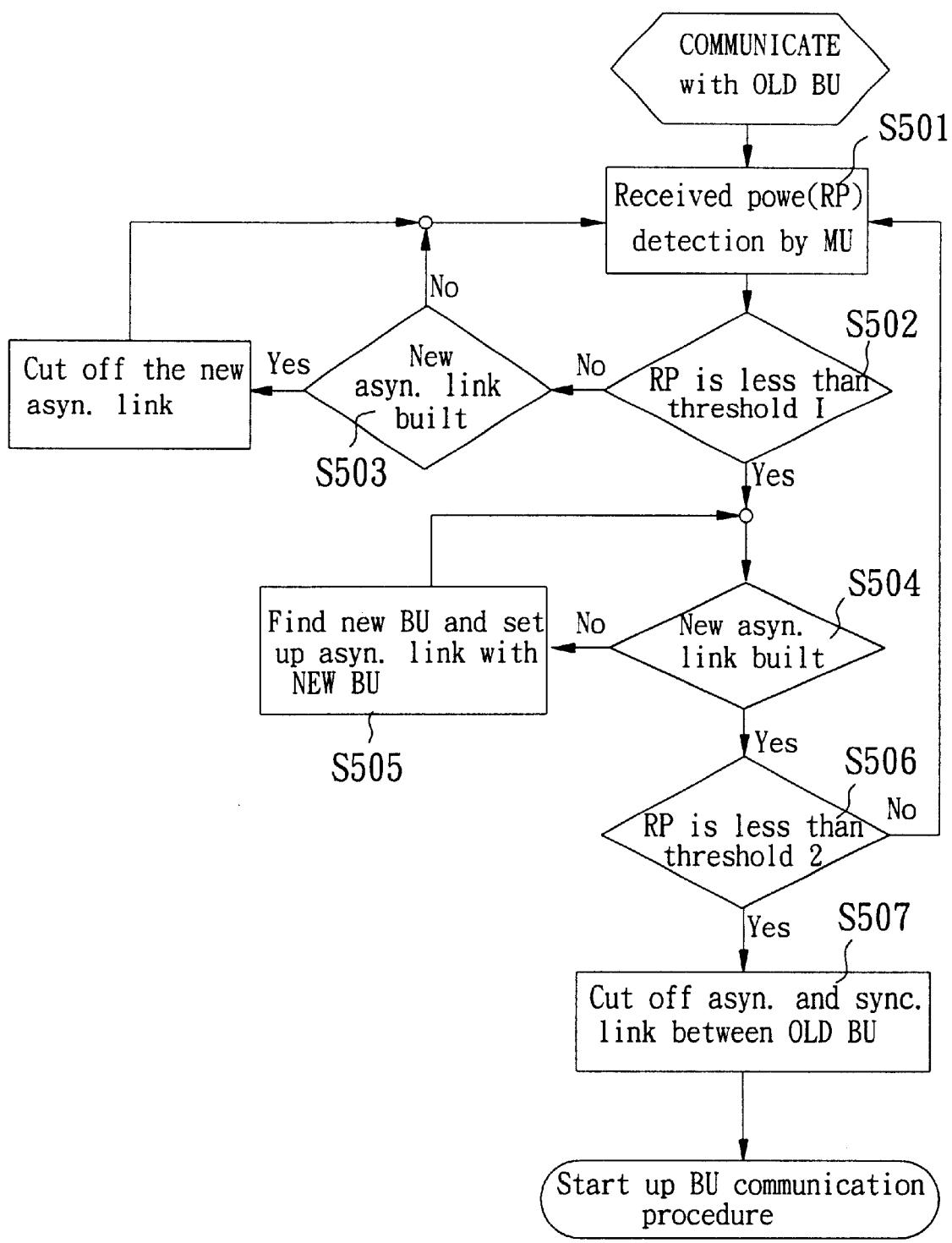
FIG. 5 shows a flow chart in the handoff process in the multi-linguistic wireless spread spectrum narration service system of the present invention.

FIG. 5 is a flow chart of a handoff process. When a visitor moves from one exhibition section to another exhibition section, the connected basestation unit must be changed. At first, assume the mobile unit 12 of the visitor is connected to an old basestation unit 11, and the connected basestation unit controller remains to receive the power (RP) (step S 501). Then, in step S502, the process determines whether RP is smaller than a first threshold. If not, it represents that the request remains in the exhibition section of the old basestation unit 11. Then, the process determines whether a new asynchronous connection (step S 503) is built, if not, the process performs (step S 501). If yes, the new connection is interrupted, and then step S501 is performed for continuously detecting the receiving the power.

If in step S502, it is determines that the result is yes, it represents that the visitor leaves from the exhibition section with respect to the old basestation unit 11, and now enters into an exhibition section with respect to the new basestation unit 11. Then, in step S504, process determines whether a new asynchronous connection is built. If not, a new basestation unit 11 is searched and an asynchronous connection to the new basestation unit 11 is built (step S505). If yes, the process determines wireless RP is smaller than a second threshold (step S 506). If not, it represents that after entering into the new exhibition section, the visitor again moves back to the original exhibition section, then, in step S501, the process detects the power condition. If yes in step S506, then it is determined that the visitor has entered into the new exhibition section, the asynchronous connection and synchronous connection between the mobile unit 12 and the old basestation unit 11 are terminated(step S 507), and the communication to the basestation unit is started.

From above description, the present invention has disclosed a multi-linguistic wireless spread spectrum narration service system, in which the language can be determined depending on the necessity of the user and an interactive environment can be provided to satisfy the requirement of the user. Moreover, a wireless spread spectrum technology is used to suppress the interruption effect.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A multi-linguistic wireless spread spectrum narration service system comprising:

a speech database stored with multi-linguistic narration service speech messages;

a plurality of basestation units adapted to be arranged at each exhibition section of a exhibition field, each basestation unit having a spread spectrum radio frequency processing and baseband processing module, a basestation unit controller and a data communication port, so that under the control of said basestation unit controller, said basestation unit controller captures narration service speech message from said speech database through said data communication port, and performs a wireless communication through said spread spectrum radio frequency processing and baseband processing module; and at least one mobile unit adapted for being worn by a visitor, said mobile unit having a voice encoder, a received power detector, a mobile unit controller, and a spread spectrum radio frequency processing and baseband processing module, so that under control of said mobile unit controller, said received power detector detects wireless signals of a specific basestation unit, and a synchronous or asynchronous connection is built through said spread spectrum radio frequency processing and baseband processing module, thereby receiving said narration service speech messages from said basestation unit controller.

2. The multi-linguistic wireless spread spectrum narration service system as claimed in claim 1, wherein each basestation unit transfers said narration service speech message of the exhibition content of the exhibition section to the visitor in wireless manner.

3. The multi-linguistic wireless spread spectrum narration service system as claimed in claim 1, wherein said basestation unit transfers said narration service speech message to said mobile unit through a synchronous connection.

4. The multi-linguistic wireless spread spectrum narration service system as claimed in claim 2, wherein said mobile unit transfers requests about control operation to said basestation unit controller through an asynchronous connection.

5. The multi-linguistic wireless spread spectrum narration service system as claimed in claim 1, wherein data communication is performed between said mobile unit and said basestation unit through an asynchronous connection.

6. The multi-linguistic wireless spread spectrum narration service system as claimed in claim 1, wherein each mobile unit has an identification code, and said basestation unit plays narration service speech messages of a specific language to said mobile unit according to said identification code.

7. The multi-linguistic wireless spread spectrum narration service system as claimed in claim 1, wherein when a visitor moves from one exhibition section to another exhibition section, said mobile unit worn by said visitor performs a handoff procedure for connecting to another basestation unit.

8. The multi-linguistic wireless spread spectrum narration service system as claimed in claim 7, wherein, in the handoff procedure, the mobile unit determines whether the visitor has moved from one exhibition section to another exhibition section by the magnitude of received power.

9. The multi-linguistic wireless spread spectrum narration service system as claimed in claim 8, wherein when power received by said mobile unit is smaller than a first threshold, it is determined that the visitor moves from the exhibition section with respect to said basestation unit to a new exhibition section with respect to a new basestation unit, and then, the mobile unit searches for a new basestation unit to built an asynchronous connection with said new basestation unit.

10. The multi-linguistic wireless spread spectrum narration service system as claimed in claim 9, wherein when power received by said mobile unit is smaller than a second threshold, it is determined that the visitor has entered into a new exhibition section, and the asynchronous connection or synchronous connection between said mobile unit and said original basestation unit is terminated.

* * * * *